(12) United States Patent
Todd et al.

(10) Patent No.: US 12,518,257 B2
(45) Date of Patent: Jan. 6, 2026

(54) SMART CONTRACT INVOCATION DURING DCF ANNOTATION

(71) Applicant: Dell Products L.P., Round Rock, TX (US)

(72) Inventors: Stephen J. Todd, North Andover, MA (US); Ahmed Khalid, Cork (IE); Trevor Scott Conn, Leander, TX (US); Mustafa Al-Bado, Cork (IE)

(73) Assignee: Dell Products L.P., Round Rock, TX (US)

( * ) Notice: Subject to any disclaimer, the term of this patent is extended or adjusted under 35 U.S.C. 154(b) by 13 days.

(21) Appl. No.: 18/362,787

(22) Filed: Jul. 31, 2023

(65) Prior Publication Data

US 2025/0045713 A1 Feb. 6, 2025

(51) Int. Cl.
*G06Q 20/10* (2012.01)
*G06Q 20/36* (2012.01)
*G06Q 20/38* (2012.01)
*G06Q 30/018* (2023.01)

(52) U.S. Cl.
CPC ........... *G06Q 20/10* (2013.01); *G06Q 20/36* (2013.01); *G06Q 20/389* (2013.01); *G06Q 30/018* (2013.01); *G06Q 2220/00* (2013.01)

(58) Field of Classification Search
None
See application file for complete search history.

(56) References Cited

U.S. PATENT DOCUMENTS

| | | |
|---|---|---|
| 7,302,641 B1 | 11/2007 | Yajima |
| 9,330,389 B2 | 5/2016 | Pitroda et al. |
| 10,135,607 B1 | 11/2018 | Roets |
| 10,438,290 B1 | 10/2019 | Winklevoss et al. |
| 10,581,805 B2 | 3/2020 | Simons et al. |
| 10,601,665 B2 | 3/2020 | Bathen et al. |
| 10,871,948 B1 | 12/2020 | Dowling |

(Continued)

FOREIGN PATENT DOCUMENTS

| | | |
|---|---|---|
| WO | 2018/126077 A1 | 7/2018 |
| WO | 2019/210409 A1 | 11/2019 |

(Continued)

OTHER PUBLICATIONS

Ahmed G. Gad et al. "Emerging Trends in Blockchain Technology and Applications: A Review and Outlook." (Oct. 2022). Retrieved online Apr. 2, 2025. https://www.sciencedirect.com/science/article/pii/S1319157822000891 (Year: 2022).

(Continued)

*Primary Examiner* — Paul S Schwarzenberg
(74) *Attorney, Agent, or Firm* — Workman Nydegger

(57) ABSTRACT

Invoking smart contracts in data confidence fabrics is disclosed. Trust functions are applied to data that is ingested into and/or flowing in a data confidence fabric. When a trust function is applied, a smart contract is invoked. The smart contract is configured to publish annotations to a distributed ledger that reflect the confidence information added by the trust function and to perform payment as a service such that the trust provider is paid. Publishing the annotations to a distributed ledger may be coupled or uncoupled to performing payment as a service.

16 Claims, 7 Drawing Sheets

(56) References Cited

U.S. PATENT DOCUMENTS

| | | |
|---|---|---|
| 10,915,891 B1 | 2/2021 | Winklevoss et al. |
| 11,108,891 B1 | 8/2021 | Todd et al. |
| 11,153,280 B1 | 10/2021 | Walwadkar |
| 11,188,977 B2 | 11/2021 | Youb et al. |
| 11,200,569 B1 | 12/2021 | James et al. |
| 11,308,487 B1 | 4/2022 | Foster et al. |
| 11,334,883 B1 | 5/2022 | Auerbach et al. |
| 11,416,230 B2* | 8/2022 | Todd .................. G06F 8/60 |
| 11,533,381 B1 | 12/2022 | Hockey |
| 11,562,333 B1 | 1/2023 | James et al. |
| 11,716,312 B1 | 8/2023 | McNamara, Jr. |
| 11,792,084 B1 | 10/2023 | Foukas et al. |
| 11,961,070 B2 | 4/2024 | Sarin |
| 11,971,862 B1 | 4/2024 | Han et al. |
| 11,978,044 B2 | 5/2024 | Basu et al. |
| 12,008,561 B2 | 6/2024 | Cona et al. |
| 12,032,696 B2* | 7/2024 | Todd ................ G06F 16/1734 |
| 12,045,879 B2 | 7/2024 | Rapowitz et al. |
| 12,118,613 B2 | 10/2024 | Foote et al. |
| 12,141,871 B1 | 11/2024 | James et al. |
| 2009/0024660 A1 | 1/2009 | Borgsmidt et al. |
| 2009/0028135 A1 | 1/2009 | Mantripragada et al. |
| 2009/0144313 A1 | 6/2009 | Hodge et al. |
| 2010/0082771 A1 | 4/2010 | Wood et al. |
| 2010/0153835 A1 | 6/2010 | Xiong et al. |
| 2011/0296510 A1 | 12/2011 | Hatlelid et al. |
| 2015/0379510 A1 | 12/2015 | Smith |
| 2016/0117668 A1 | 4/2016 | Pitroda et al. |
| 2017/0132620 A1 | 5/2017 | Miller et al. |
| 2018/0101906 A1 | 4/2018 | McDonald et al. |
| 2018/0218343 A1 | 8/2018 | Kolb et al. |
| 2018/0276626 A1 | 9/2018 | Laiben |
| 2018/0287800 A1 | 10/2018 | Chapman et al. |
| 2018/0329693 A1 | 11/2018 | Eksten et al. |
| 2019/0019251 A1 | 1/2019 | Phillips, IV |
| 2019/0116158 A1 | 4/2019 | Patil et al. |
| 2019/0238316 A1 | 8/2019 | Padmanabhan |
| 2019/0260803 A1 | 8/2019 | Bykampadi et al. |
| 2019/0303942 A1 | 10/2019 | Balaraman et al. |
| 2019/0333054 A1 | 10/2019 | Cona et al. |
| 2019/0347406 A1 | 11/2019 | Lev-Ran et al. |
| 2019/0379642 A1 | 12/2019 | Simons et al. |
| 2019/0385153 A1 | 12/2019 | Cui et al. |
| 2019/0385154 A1 | 12/2019 | Cui et al. |
| 2019/0386969 A1 | 12/2019 | Verzun et al. |
| 2020/0007312 A1 | 1/2020 | Vouk et al. |
| 2020/0027089 A1 | 1/2020 | Kuchar et al. |
| 2020/0104819 A1 | 4/2020 | Garcia |
| 2020/0112443 A1 | 4/2020 | Todd |
| 2020/0120023 A1 | 4/2020 | Munson et al. |
| 2020/0133955 A1 | 4/2020 | Padmanabhan et al. |
| 2020/0236102 A1 | 7/2020 | Azulay et al. |
| 2020/0313856 A1 | 10/2020 | Basu et al. |
| 2020/0344233 A1 | 10/2020 | Lai et al. |
| 2021/0027404 A1 | 1/2021 | De Bold |
| 2021/0082044 A1 | 3/2021 | Sliwka et al. |
| 2021/0112117 A1 | 4/2021 | Munson et al. |
| 2021/0124727 A1 | 4/2021 | Todd et al. |
| 2021/0124728 A1 | 4/2021 | Todd et al. |
| 2021/0126794 A1 | 4/2021 | Forrester et al. |
| 2021/0164794 A1 | 6/2021 | Nagpal et al. |
| 2021/0192520 A1 | 6/2021 | Patel et al. |
| 2021/0209684 A1 | 7/2021 | Foote et al. |
| 2021/0243167 A1 | 8/2021 | Todd et al. |
| 2021/0243218 A1* | 8/2021 | Todd .................. H04L 9/50 |
| 2021/0304065 A1 | 9/2021 | Todd et al. |
| 2021/0328886 A1 | 10/2021 | Guim et al. |
| 2021/0342803 A1 | 11/2021 | Yoo |
| 2021/0365445 A1 | 11/2021 | Robell et al. |
| 2021/0366586 A1 | 11/2021 | Ryan et al. |
| 2021/0374730 A1* | 12/2021 | Todd .................. G06Q 20/12 |
| 2021/0385216 A1 | 12/2021 | Khalil et al. |
| 2021/0405983 A1 | 12/2021 | Todd et al. |
| 2021/0409436 A1 | 12/2021 | Todd et al. |
| 2022/0021711 A1 | 1/2022 | Marsh et al. |
| 2022/0038289 A1 | 2/2022 | Huang |
| 2022/0084015 A1 | 3/2022 | Fawzy et al. |
| 2022/0100858 A1 | 3/2022 | Todd |
| 2022/0100879 A1 | 3/2022 | Todd et al. |
| 2022/0116445 A1 | 4/2022 | Filippou et al. |
| 2022/0129555 A1* | 4/2022 | Todd ................ G06F 16/24568 |
| 2022/0138325 A1* | 5/2022 | Todd .................. G06F 21/54 |
| | | 726/26 |
| 2022/0188800 A1 | 6/2022 | Sells et al. |
| 2022/0210061 A1 | 6/2022 | Simu et al. |
| 2022/0253842 A1 | 8/2022 | James et al. |
| 2022/0261882 A1 | 8/2022 | Youb et al. |
| 2022/0272127 A1 | 8/2022 | Yawalkar et al. |
| 2022/0294690 A1* | 9/2022 | Nolan ................ G06F 16/1834 |
| 2022/0327529 A1 | 10/2022 | Williams et al. |
| 2022/0351232 A1 | 11/2022 | Chan et al. |
| 2023/0114684 A1 | 4/2023 | Jakobsson et al. |
| 2023/0155984 A1 | 5/2023 | Adam et al. |
| 2023/0173395 A1 | 6/2023 | Cella et al. |
| 2023/0196318 A1 | 6/2023 | Rosen et al. |
| 2023/0230091 A1 | 7/2023 | Vaughn |
| 2023/0237403 A1 | 7/2023 | Reineke et al. |
| 2023/0237499 A1 | 7/2023 | Padmanabhan |
| 2023/0334492 A1 | 10/2023 | Tai et al. |
| 2023/0351393 A1 | 11/2023 | Cella et al. |
| 2023/0362015 A1 | 11/2023 | Kayaba et al. |
| 2024/0046318 A1 | 2/2024 | Muriqi |
| 2024/0106839 A1 | 3/2024 | Smith et al. |
| 2024/0152889 A1 | 5/2024 | Todd et al. |
| 2024/0152911 A1 | 5/2024 | Rezaiean-Asel et al. |
| 2024/0249277 A1 | 7/2024 | Hwang |
| 2024/0256691 A1 | 8/2024 | Hwang |
| 2024/0281799 A1 | 8/2024 | Ryan |
| 2024/0289776 A1 | 8/2024 | Bimolaksono et al. |
| 2024/0354735 A1 | 10/2024 | Kell et al. |
| 2024/0354747 A1 | 10/2024 | Belostock et al. |
| 2024/0364521 A1 | 10/2024 | Tang |
| 2025/0088376 A1 | 3/2025 | Ren et al. |

FOREIGN PATENT DOCUMENTS

| | | |
|---|---|---|
| WO | 2020/124317 A1 | 6/2020 |
| WO | 2021/173716 A1 | 9/2021 |

OTHER PUBLICATIONS

Choudhury et al. "Impact of Distributed Ledger Technology in Global Capital Markets." (May 16, 2023) Retrieved online Apr. 2, 2025. https://www.gfma.org/wp-content/uploads/2023/05/impact-of-dlt-on-global-capital-markets-full-report.pdf (Year: 2023).

John Kolb. "A Languge-Based Approach to Smart Contract Engineering." (Dec. 18, 2020). Retrieved online Apr. 2, 2025. https://www2.eecs.berkeley.edu/Pubs/TechRpts/2020/EECS-2020-220.pdf (Year: 2020).

Murphy et al, Towards trust-based data weighting in machine learning, 2023 IEEE 31ST International Conference On Network Protocols (ICNP), pp. 1-6 (Oct. 2023) (Year: 2023).

\* cited by examiner

SMART CONTRACT INVOCATION DURING DCF ANNOTATION

RELATED APPLICATIONS

This application is related to U.S. Ser. No. 18/053,490 filed Nov. 8, 2022, and entitled SMART CONTRACT DEPLOYMENT FOR DCF TRUST SERVICES BILLING, which application is incorporated by reference in its entirety.

FIELD OF THE INVENTION

Embodiments of the present invention generally relate to data confidence fabric networks and data delivery in data confidence fabric networks. More particularly, at least some embodiments of the invention relate to systems, hardware, software, computer-readable media, and methods for using smart contracts to perform publishing operations and payment as a service operations in data confidence fabrics.

BACKGROUND

Computing and other electronic devices come in a variety of types and form factors and have varying capabilities. Many of these devices generate data that may be used by various applications. There is often a question, however, about the value of the data or the confidence that an application can place in the data. In other words, applications benefit from using data in which there is high confidence. Applications that execute using data associated with high confidence levels typically generate more reliable results and outputs.

Applying trust services or functions to data allows applications or users to trust the data and can improve the confidence in how the data is used and in the results of using the data. Providing trust services or functions, however, is not without cost.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
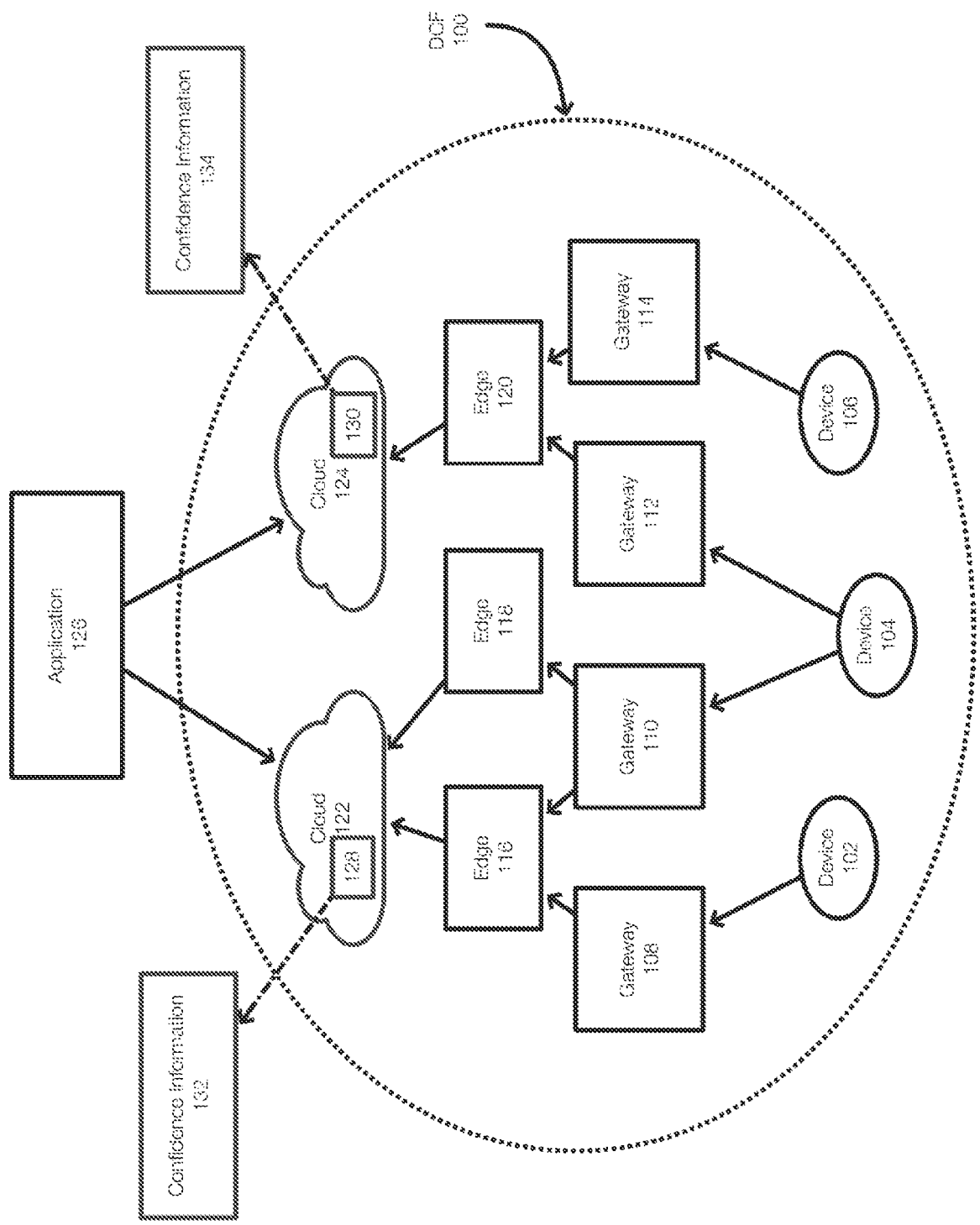
FIG. 1 discloses aspects of a computing system such as a data confidence fabric network.

Embodiments of the present invention generally relate to computing systems or ecosystems such as data confidence fabrics (DCFs). In one example, a DCF is a system or network of hardware (e.g., computers, servers, routers, network interface cards, storage including immutable storage and/or other hardware) that is provisioned (e.g., with software, services) to score or rank data that may be ingested into and/or transmitted through the DCF. Communications in a DCF may include wired (e.g., ethernet) and/or wireless communications. The data ingested into the DCF can be made available to applications, which may also be part of the DCF. The applications can leverage the confidence scores of the data.

Embodiments of the invention relate to DCF configurations that include or are configured to include or be associated with smart contracts, cryptocurrencies, and the like. When providing trust services in a network, such as an edge network or in an edge context, embodiments of the invention related to a licensing or payment-as-a-service models in a decentralized context in one example.

In some example embodiments, applications or other data sources may generate and/or share data with other applications or users. Trust in this data can be improved by joining a DCF that is configured to perform trust functions to or on the data. These trust functions (e.g., trust insertion technologies) may be provided by various providers and may be hardware based and/or software based.

A DCF may include an interface system. Applications may access the interface system using, for example, an API (Application Programming Interface). The interface system may be configured to provide publishing functionality and payment as a service functionality such that trust providers can charge a fee for use of their trust functions or trust insertion technologies. In one example, a smart contract may be used to facilitate these publishing and payment operations. In one example, payment may be collected when annotations, which reflect trust functions that have been applied to the data, are written to a distributed ledger. Thus, the payment as a service provided by the DCF is coupled with or relates to the act or step of publishing annotations to a distributed ledger. In another example, the act or step of providing payment as a service may be decoupled from the act or step of publishing trust information.

A DCF is generally configured to add or associate annotations to data. The annotations include confidence information, which can take various forms including a confidence score, trust information, and/or associated metadata. The confidence information can be added from a hardware perspective and/or a software perspective.

A DCF, by way of example only, may be an architecture and set of services that allow data to be ingested and used by applications. The DCF may include or be associated with trust insertion technologies (hardware and/or software) that are applied to the data as the data flows through the DCF. Each time a trust insertion technology is applied, an annotation may be made in a ledger or other structure and the confidence score of the data may be changed. Thus, the confidence score of data provides a view into the trustworthiness of the data to an application. Trust or confidence information can be added from both hardware and software perspectives. Data may be associated with an overall confidence score. In addition, a confidence score may be generated for each trust insertion technology. This allows an application, for example, to evaluate how to trust the data in the context of a specific trust insertion technology.

The trust insertion technologies may be applied by performing trust functions. Further, each of the trust insertion technologies may be associated with a trust provider.

A DCF may include various interconnected hardware environments (e.g., nodes). These nodes may have varying hardware capabilities that are examples of trust insertion technologies or hardware-assisted trust insertion technologies. The hardware is configured, such that as data flows from data sources to storage or to applications in a DCF system, scores or confidence information or other annotations can be attached to or associated with the data. As the data is handled by various forms of trust insertion technologies, the overall score or ranking (e.g., a confidence or trustworthiness score) of the data may change. The data scored or ranked in the DCF system may be stored in various locations, such as a data lake, in a datacenter, Public Cloud data storage service, or the like. The annotations, which may include confidence information, a confidence score and/or rank, is made available to one or more applications or other clients or users. The confidence information may include, in addition to a confidence score and/or rank, tables, audit information, and the like.

Confidence scores, which may be determined from hardware aspects and/or software aspects of a DCF, allow an application to explore or exploit the data for potential analysis or consumption. The confidence score or rank of the data allows an application to understand or account for the trustworthiness of the data. For example, the confidence score of the data may have an impact on whether the data is actually used by the application. An application may require a minimum confidence score or have other requirements related to the confidence score.

For example, an application operating in a nuclear facility may need to use data that are very trustworthy (have a high confidence score) while data that is used by an application to control lights in a home may not need to be as trustworthy (a lower confidence score is acceptable). In the context of a nuclear facility, an application may require that the hardware handling the data be firewalled from outside sources, provide hardware assisted encryption, deterministic routing, or the like or combination thereof while data used to control lights may not require these trust services. The trust functions required or desired by an application can be specified and the DCF may perform these trust functions when available. The payment as a service allows payment to be made for each trust function that is performed, each time annotations are committed to a distributed ledger, or the like.

FIG. 1 illustrates an example of a data confidence fabric network (DCF 100). The DCF 100 includes varies computing and hardware components, connections, and environments. The DCF 100 is configured to add confidence information including confidence scores to data flowing in the DCF 100.

FIG. 1 illustrates examples of data routes or paths in the DCF 100. A specific path of specific data may be referred to as a graph. In FIG. 1, data generated by devices 102, 104, and 106 may flow through multiple levels or multiple hardware environments such as gateways 108, 110, 112, and 114, edges 116, 118, 120, and clouds 122 and 124. In one example, the data may be stored in the clouds 122 and 124.

As the data 128 and the data 130 flow through the DCF 100, the DCF 100 may add annotations (e.g., confidence information) to the data. After flowing through the DCF 100, the data 128 (which may have been generated by one of the devices 102, 104, and/or 106) is stored in the cloud 122 and made available to an application 126. Similarly, the data 130 may be made available to the application 126. Alternatively, the data 128 and 130 are delivered directly to the application 126. The data 128 is associated with confidence information 132 and the data 130 is associated with confidence information 134. The confidence information 132 and 134 may include confidence scores, provenance data, audit trails, data graphs, applied trust insertion technologies or trust functions, or the like. Data flowing through a DCF is typically more valuable and useful at least because the confidence scores or ranks of DCF annotated data allow an application to decide how to trust and/or use the associated data.

Figure 2:
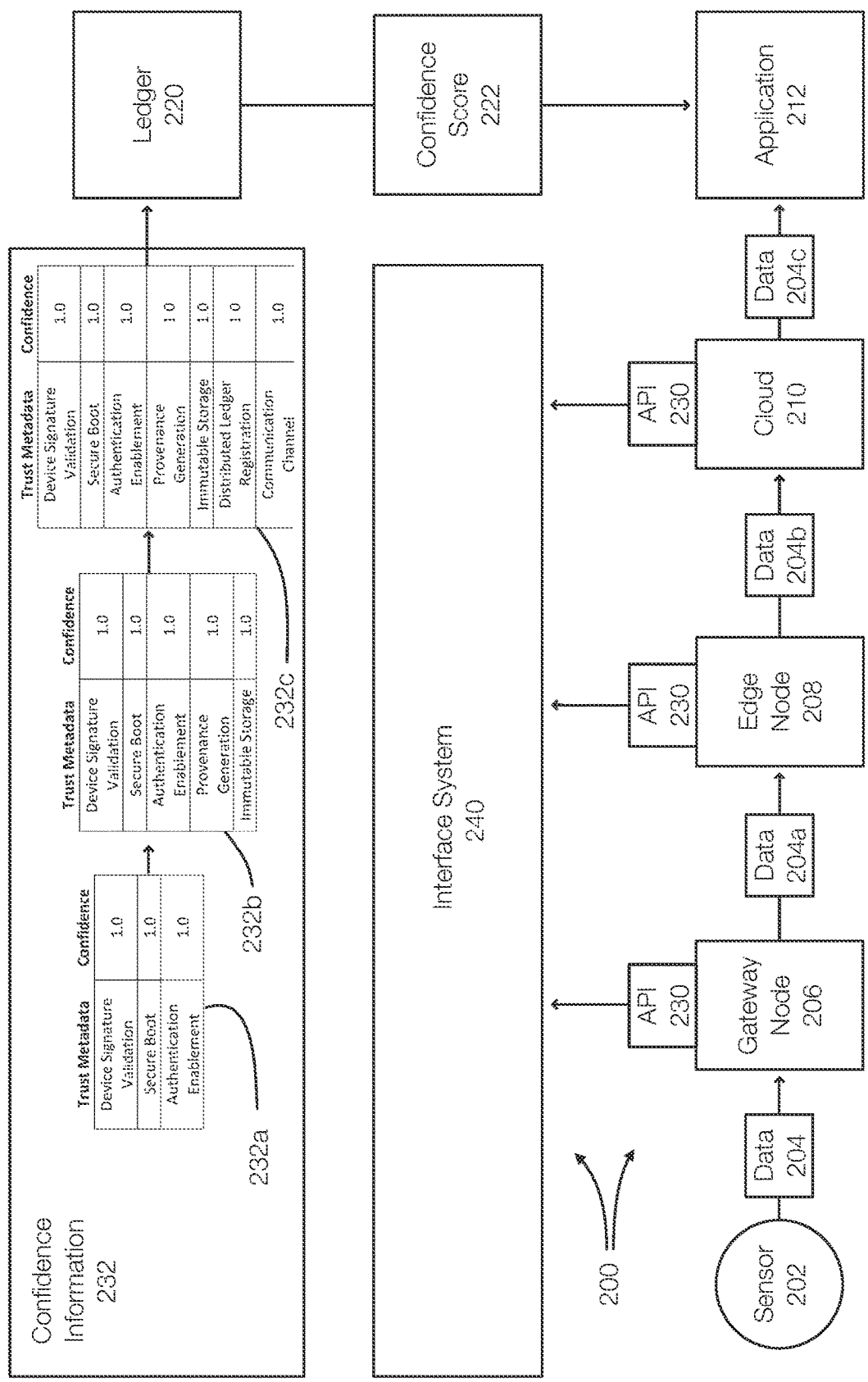
FIG. 2 discloses additional aspects of a computing system such as a data confidence fabric network.

FIG. 2 discloses additional aspects of a data confidence fabric network. FIG. 2 illustrates a DCF 200, which is an example of the DCF 100. In the DCF 200, data 204 is generated by a sensor 202 (or other devices such as user devices) and is ingested into the DCF 200. The data 204 may be received at a gateway node 206, which interfaces with an interface system 240 of the DCF 200 to annotate the data 204 with confidence information.

As illustrated in FIG. 2, confidence information 232 is generated and accompanies the data 204 as the data 204 is routed in the DCF 200. At the gateway node 206, for example, the data 204 is annotated with confidence information 232a, which relates to trust insertion technologies such as a device signature validation, a secure boot, and an authentication enablement. Each of these trust insertion technologies, in this example, are performed and add a score that is reflected in the confidence information 232a. More specifically, the gateway node 206 may access an interface system 240 using an application programming interface (API) 230, which is an example of a DCF driver, to record the confidence information 232a. The data 204 and the annotations or confidence information may be transmitted together or maintained separately.

Next, the data 204a (which is the annotated data 204 after passing through the gateway node 206) is routed to an edge node 208 and additional confidence information is added as reflected in the confidence information 232b. Thus, the data 204a arrives at the edge node 208 and is already associated with the confidence information 232a. The edge node 208 may add apply additional trust insertion technologies such as provenance generation and immutable storage. These trust insertion technologies allow the confidence information to be augmented as illustrated by the confidence information 232b. Thus, the data 204b leaving the edge node 208 is associated with the confidence information 232b.

Next, the data 204b arrives at the cloud 210 and additional confidence information is added as illustrated by the confidence information 232c. Thus, the cloud 210 may apply or use a trust insertion technology such as distributed ledger registration and the confidence information 232 is updated as shown by the confidence information 232c.

In one example, the confidence information 232 is stored in a ledger 220. As a result, the confidence information 232 is secure and can be accessed by an application 212. In this example, the data 204 arrives at the application 212 as the annotated data 204c, which is associated with the annotations or confidence information 232c and with a confidence score of, in this example, 7.0. In this example, the confidence information 232c includes confidence information related to the communication channel and the associated score of 1.0 may reflect that the selection, performance, and operation of a selected communication channel was as expected and used to deliver the data 204c. The application 212 thus has insight into the trustworthiness of the data 204 generated at the sensor 202 and has insight into the communication channel.

The confidence score can be generated in different ways. The various trust insertion technologies may be weighted or have different scores. For example, the DCF 200 may be associated with a maximum confidence score (e.g., 10). If the data 204 had followed a different route in the DCF 200, the confidence score may be different. For example, other nodes may have trust insertion technologies that could have increased the confidence score of the data 204. Different routes may also result in lower confidence scores.

Figure 3A:
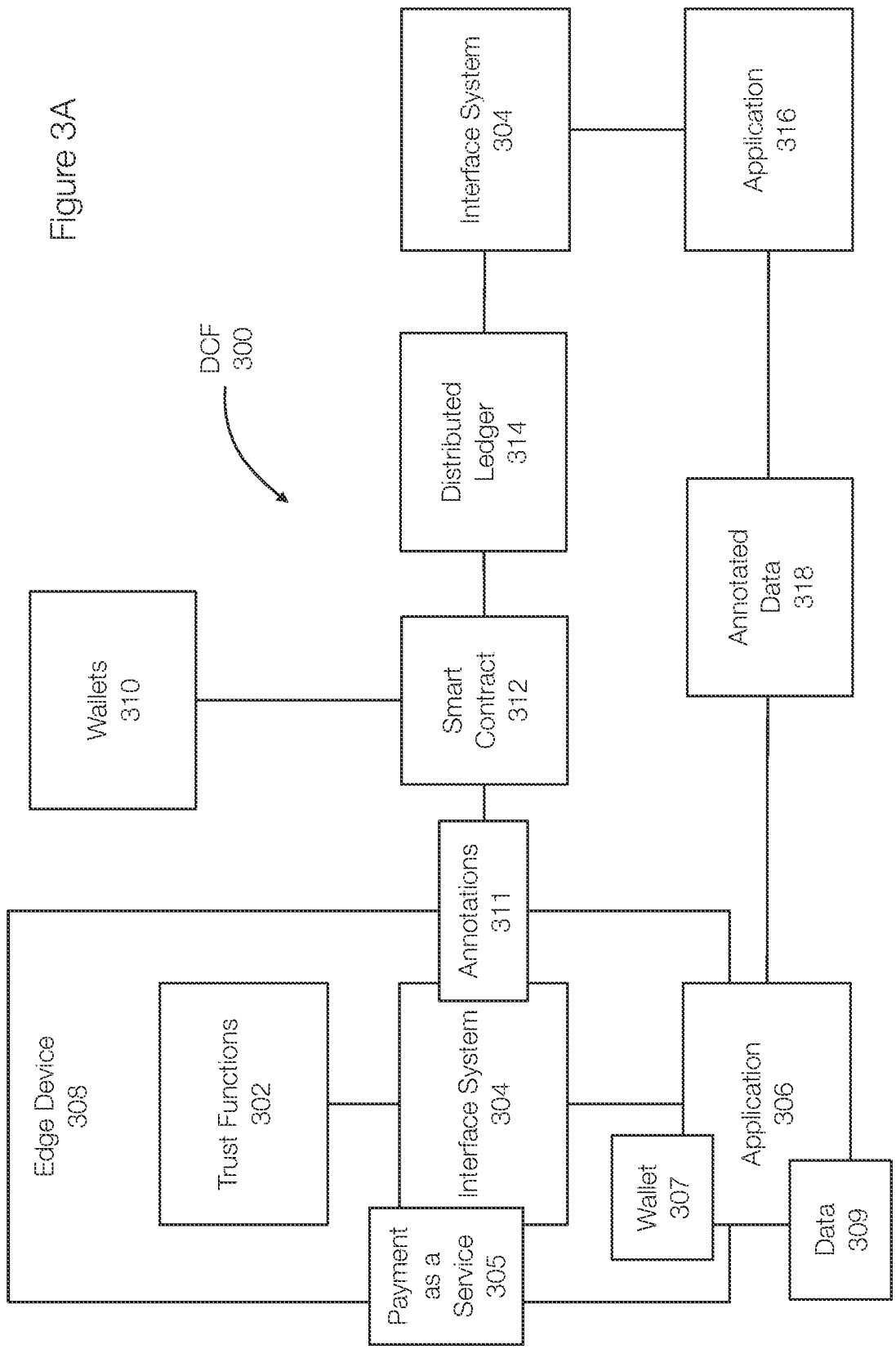
FIG. 3A discloses aspects of implementing payment as a service in a data confidence fabric and publishing annotations to a ledger in a coupled manner.

FIG. 3A discloses aspects of implementing payment as a service in a data confidence fabric using a smart contract. FIG. 3A further illustrates an example of publishing data (e.g., annotations) to a distributed ledger 314 using a smart contract 312 and illustrates that payment is coupled to with publishing the annotations 311 to the distributed ledger 314.

FIG. 3A illustrates an edge device 308 that may be representative of one or more devices, each of which may be associated with trust insertion technologies and are configured to insert trust. Thus, the data 309 may flow through multiple devices and multiple trust functions may be applied to the data 309. In one embodiment, the application 306 (or data source) may be associated with the DCF 300 or may join the DCF 300.

When the DCF 300 initially joined the DCF 300 (or at another time), the application 306 may connect a wallet 307 (e.g., a crypto wallet or other source of funds) to the interface system 304. The interface system 304 may include payment as a service 305. The wallet 307, once associated with the interface system 304 or the payment as a service 305 is used in paying for various services (the trust functions or for applying the trust insertion technologies to the data) provided by trust providers and/or by the DCF 300.

In one example, the application 306 may request, via an API to the interface system 304, that certain trust functions 302 be applied to data 309 associated with the application 306. The application 306 may specify specific trust functions. The interface system 304 may ensure that the trust functions 302 identified by the application 306 are applied to the data 309. The data 309, once annotated with annotations related to the trust functions 302 applied to the data 309, is returned to the application 306 as annotated data 318. The application 306 can share the annotated data 318 with other applications, such as the application 316. Alternatively, the interface system 304 may forward the annotated data 318 to the application 316 or make the annotated data 318 available to the application 316.

In one embodiment, the interface system 304 may send the annotations 311 generated by the trust functions 302 to a smart contract 312. The annotations 311 may be passed as a parameter and by calling a function of the smart contract 312 that requires a fee. The interface system 304 may also send the required fee with the annotations 311 when calling the function of the smart contract 312. The application 306 (or user) should ensure that the wallet 307 has sufficient funds to pay the required fee or fees.

The smart contract 312 executes and may initially check to make sure that the wallet 307 includes sufficient funds or currency. If the funds are insufficient, the process fails and the annotations 311 are not committed to the distributed ledger 314. If the funds in the wallet 307 are sufficient, the smart contract 312 executes to write the annotations 311 to the distributed ledger 314 and transfer the fee from the wallet 307 to the wallets 310. If there is a fee associated with using the distributed ledger 314, the fee for using (e.g., writing) the distributed ledger 314 is also transferred from the wallet 307.

The wallets 310 may include a wallet for each trust provider. As discussed with respect to FIGS. 1 and 2, data may traverse multiple nodes and may benefit from multiple trust insertion technologies. Payment, facilitated by the payment as a service provided by the DCF 300, may be performed each time that annotations are published to the distributed ledger 314.

The application 316, which receives/accesses the annotated data 318, may receive the annotated data 318 via a data plane. In one example, the data and the annotations are stored separately. The application 316 may access the interface system 304 and request confidence information (e.g., a confidence score) for the annotated data 318. The confidence score may be determined by querying the annotations in the distributed ledger 314 written by the smart contract 312. In one example, the smart contract 312 may be the only authorized entity to write messages (e.g., the annotations 311) to the distributed ledger 314. Where write access is open to others, the smart contract 312 allows trust and confidence to be built while ensuring that providers are paid for applying trust information technologies to the data 309.

FIG. 3A thus illustrates that a smart contract 312 is configured to publish annotations 311 to the distributed ledger 314 while, at the same time, ensuring that trust providers are paid by transferring funds or currency from the wallet 307 to one or more of the trust provider wallets 310.

Figure 3B:
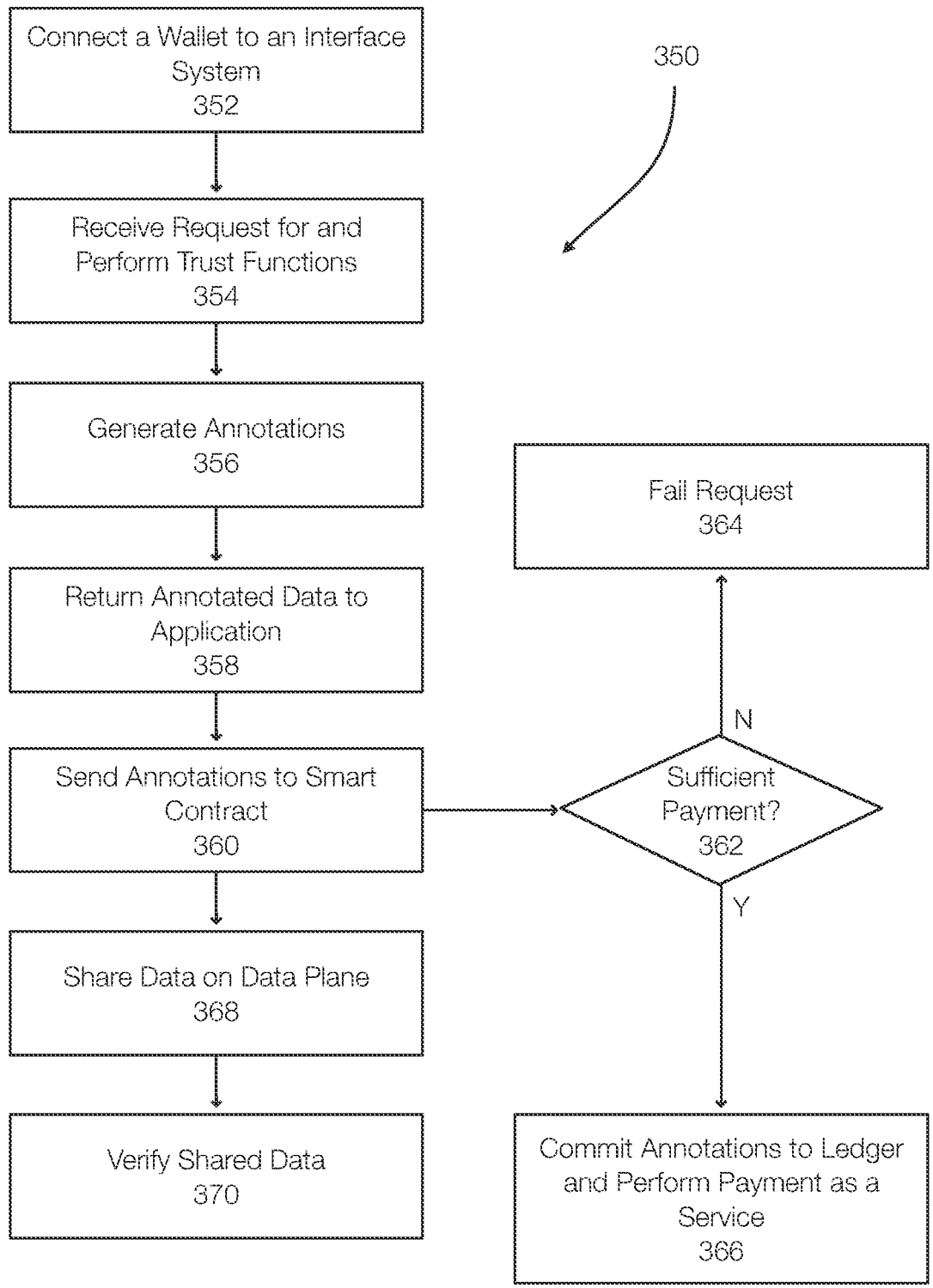
FIG. 3B discloses aspects of publishing annotations to a ledger while providing payment as a service when providing payment as a service is coupled with publishing annotations.

FIG. 3B discloses aspects of publishing annotations and providing payment as a service. The method 350 includes various steps and acts that may be performed independently. For example, the process of publishing annotations to a ledger and providing payment as a service may be performed as a method and is represented in FIG. 3B. Further, the entire process of operating a DCF in the context of publishing annotations to a ledger and providing payment as a service may also be represented in FIG. 3B.

The method 350 may include connecting 352 a wallet to an interface system. The wallet may be associated with an application, a user, an entity, or the like and the interface system may be authorized to transfer funds from the wallet when certain conditions are met, such as those specified in a smart contract. The wallet may be connected when an application joins a DCF or at a later time.

Next, the DCF (e.g., the interface system) may receive a request for trust functions to be applied to data of the application and may perform 354 those functions at the appropriate time and location. Stated differently, an application may request that certain trust functions be applied to data generated by the application. The trust functions may be applied as the data is ingested into the DCF. As the trust functions are applied, annotations are generated 356. The annotated data may be returned 358 to the application or the DCF may retain and forward the annotated data as necessary. For example, the annotated data may be stored in immutable storage and made available to other applications.

At various times (e.g., each time an annotation is generated), the interface system may send 360 the annotations to a smart contract. If the wallet associated with the application or with the annotated data does not have sufficient funds or currency (N at 362), then the operation fails and the annotations are not published to a distributed ledger. The consequence is that confidence information associated with the data are not made available to applications that may want to use the data. Further, the ability of the application to have its data annotated may be restricted.

If sufficient funds exist in the wallet (Y at 362), the interface system (or the smart contract) initiates a transaction where funds are transferred from the wallet associated with the application to the wallets of the trust providers whose trust insertion technologies provided or performed the trust functions on the data. Thus, payment as a service and publishing the annotations are performed at substantially the same time. More specifically, the annotations are committed to the distributed ledger and payment as a service is performed 366.

While the annotations are being published, the data may be shared 368 on a data plane. Applications that use the shared data may verify 370 the data. Verifying 370 the data may include accessing, via the interface system or DCF, confidence information or confidence scores associated with the shared data that are stored in the distributed ledger.

Figure 4A:
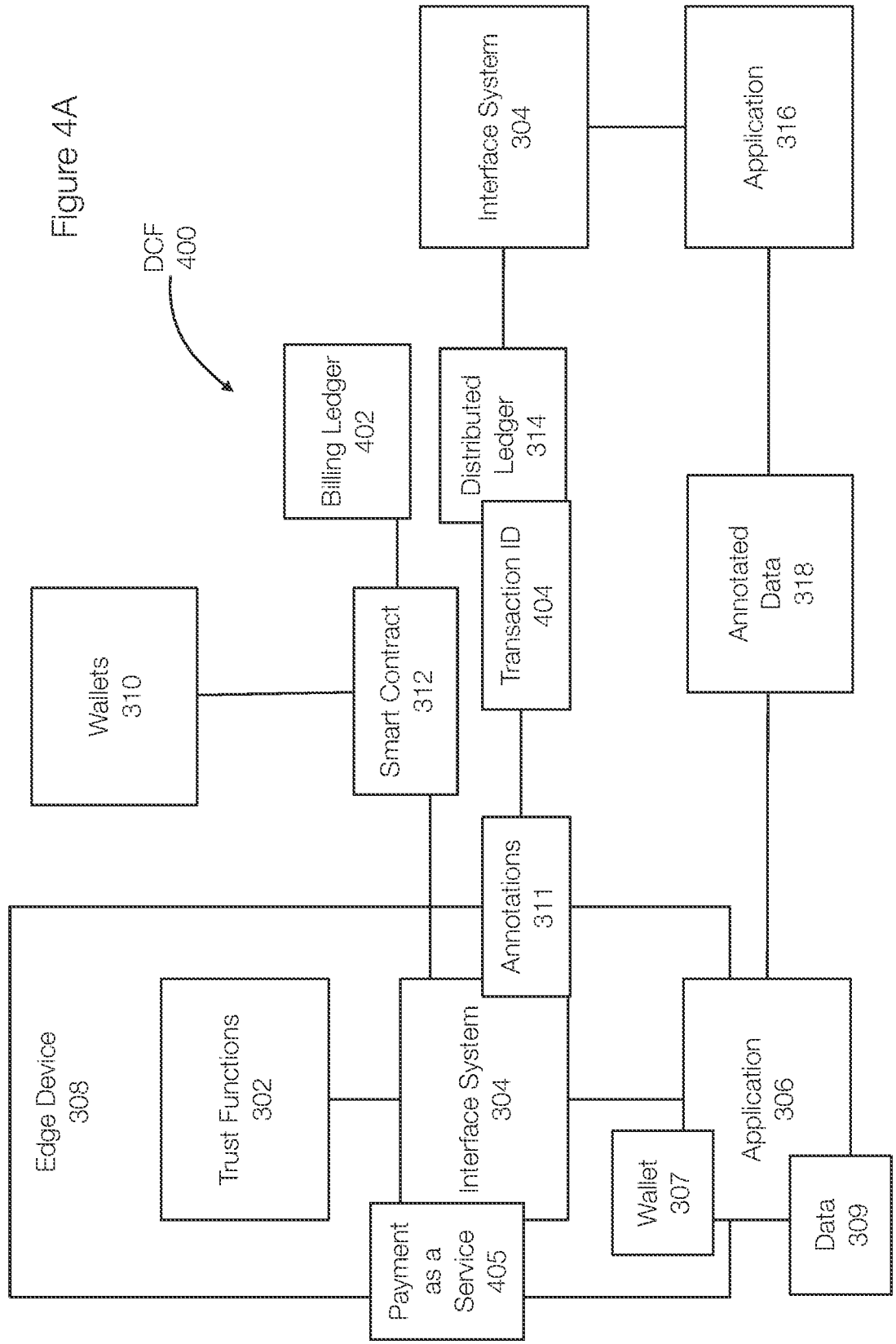
FIG. 4A discloses aspects of implementing payment as a service in a data confidence fabric and publishing annotations to a ledger in a decoupled manner.

FIG. 4A discloses aspects of implementing payment as a service in a data confidence fabric and publishing annotations to a ledger in a decoupled manner. FIG. 4A is similar to FIG. 3A and similar elements are similarly numbered. In this example, however, publishing the annotations to the distributed ledger 314 is not coupled with providing payment as a service.

Thus, the payment as a service 405 is distinct from the payment as a service 305, although both coupled and uncoupled mechanisms may be provided simultaneously. Thus, the interface system 304 can adapt and accommodate multiple forms of payment.

In this example, after the trust functions 302 requested by the application 306 have been applied to the data 309, the interface system 306 may write the annotations 311 (e.g., confidence information, trust metadata) directly to the distributed ledger 314. A transaction identifier (ID) 404 is returned by the distributed ledger 314.

The payment as a service can be invoked at any time by transferring the transaction ID 404 to the smart contract 312. The interface system 304 may transfer multiple transaction IDs at the same time or in the same batch. Thus, the payment as a service can be performed at each transaction, after a specified time period, after a transaction count threshold, after a funds due threshold is passed, or the like.

When the transaction ID 404 is provided to the smart contract 312, the smart contract may execute to transfer funds from the wallet 307 to the pertinent wallets 310. The transaction ID 404 may include enough information (e.g., amount owed, purchaser, vendor, wallet IDs) such that payment can be made. Thus, the fee of a particular trust provider is transferred to the wallet of that particular trust provider. A record of the currency or transfers (e.g., the transaction) are published to the billing ledger 402, which may also be a distributed ledger.

Figure 4B:
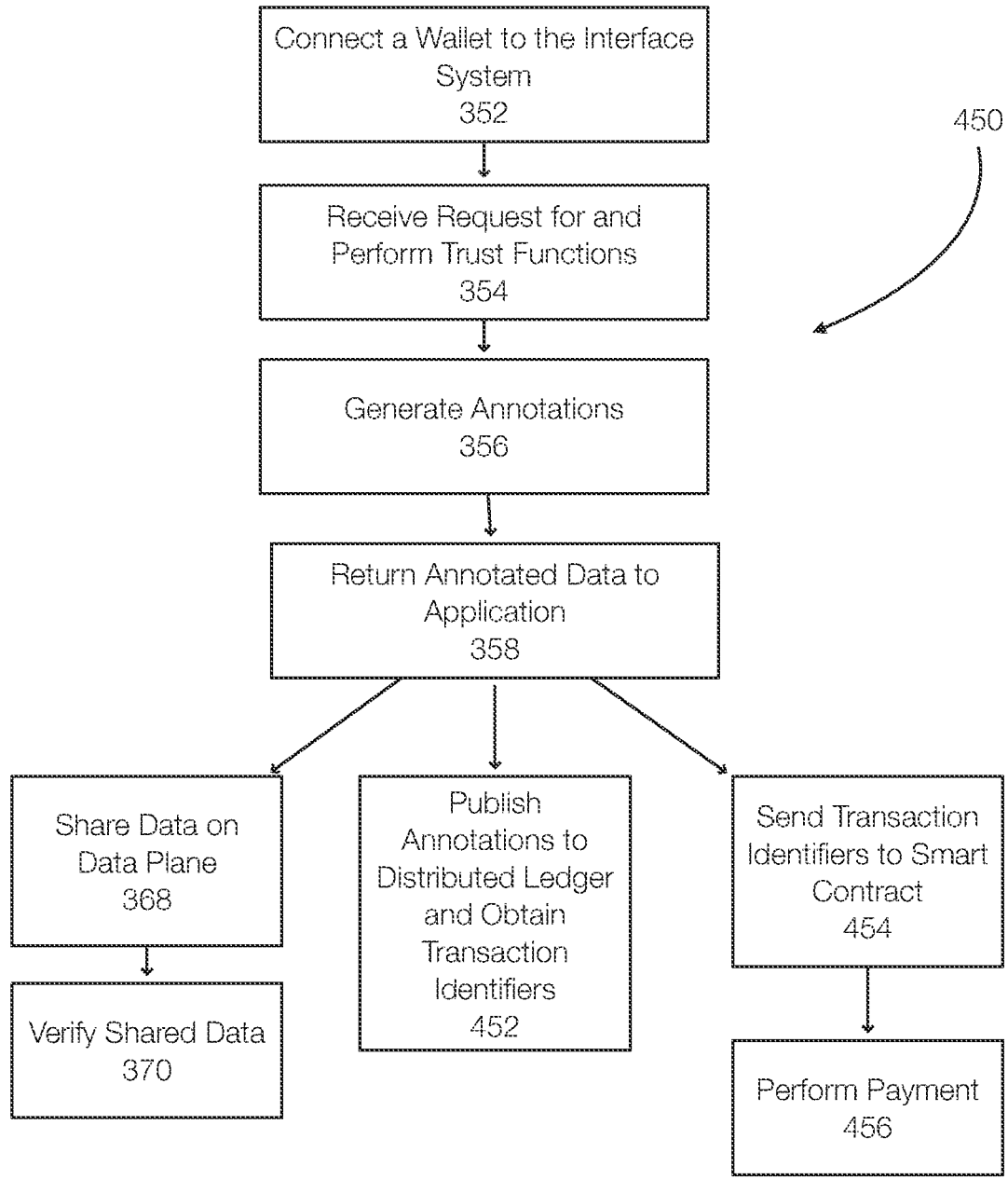
FIG. 4B discloses aspects of publishing annotations to a ledger while providing payment as a service when providing payment as a service is decoupled from publishing annotations.

FIG. 4B discloses aspects of publishing annotations to a ledger while providing payment as a service when providing payment as a service is decoupled from publishing annotations. The method 450 includes steps or acts that are similar to corresponding acts or steps in the method 350. After a wallet is connected 352 to an interface system and trust functions have been requested and performed 354, annotations or confidence information is generated 356 and the annotated data is returned to the application 358.

The method 350 decouples publishing the annotations to the distributed ledger from performing or providing payment as a service. In one embodiment, the annotations are published to a distributed ledger and transaction identifiers are obtained 452. Simultaneously or at another time or after the transaction identifiers are obtained, the transaction identifiers are sent 454 to a smart contract. The smart contract executes to perform 456 payment. Payment is performed by transferring fees or funds from the wallet associated with the application to wallets of the relevant trust providers.

In addition, the data may be shared 358 on a data plane and applications that used the shared data may verify 370 the shared data by querying the DCF for confidence information or confidence scores.

In one embodiment, annotations may be published to the distributed ledger without payment being performed. In one example, subsequent writes to the distributed ledger may be prevented until payment is completed for previous transactions.

FIGS. 3A, 3B, 4A, and 4B describe different methods for publishing annotations to a distributed ledger and performing payment as a service. In FIGS. 3A and 3B, a smart contract is configured to write (e.g., publish trust metadata, annotations, confidence information) to the distributed ledger. In fact, the smart contract may be the only authority configured to write to the distributed ledger. The smart contract also performs payment as a service by transferring the relevant fee to the trust provider's wallet. The methods illustrated in FIGS. 3A and 3B strongly couple publishing annotations and performing payment as a service. This approach ensures that each instance of inserting trust (performing trust functions) is paid.

In one example, this coupled approach may be configured for scenarios where the number of write operations to the distributed ledger is relatively low and the cost of trust operations is relatively high.

FIGS. 4A and 4B illustrate an approach where publishing annotations is decoupled from providing payment as a service. In one embodiment, publishing annotations operates in parallel with providing payment as a service. Thus, the interface system published annotations to the distributed ledger, receives a confirmation (e.g., the transaction identifier), and then invokes a call to the smart contract to perform payment. The call may be invoked at any time and need not be performed immediately following publication of the annotations to the distributed ledger. This allows write operations for the annotations to be performed faster while performing payment operations at a lower speed or rate.

In the event that a trust provider is not paid, embodiments of the invention can limit the number of unpaid transactions prior to blocking an application until payment is cleared. The decoupled approach also facilitates flexible payment operations such as bulk payments, overdrafts, customer defined payments, or the like.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, payment as a service operations, distributed ledger related operations, publishing operations, data confidence fabric and related operations. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning operations initiated by one or more clients or other elements of the operating environment.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients, applications, or systems, that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

Example embodiments of the invention are applicable to any system capable of storing and handling various types of data of objects, in analog, digital, or other form. Rather, such principles are equally applicable to any object capable of representing information.

It is noted that any operation(s) of any of these methods disclosed herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: sending annotations, in a data confidence fabric, to a smart contract, wherein the annotations relate to trust functions that have been applied to data, publishing the annotations to a distributed ledger, and performing payment as a service by a smart contract, wherein the smart contract is configured to transfer funds from a wallet of a user to a wallet of a trust provider that provided the trust functions.

Embodiment 2. The method of embodiment 1, wherein publishing the annotations is performed by the smart contract and is coupled to performing the payment as a service by the smart contract.

Embodiment 3. The method of embodiment 1 and/or 2, wherein the annotations are not published to the distributed ledger when the payment as a service fails to transfer the funds.

Embodiment 4. The method of embodiment 1, 2, and/or 3, further comprising performing the trust function on the data, wherein the data is generated by an application or obtained from a data source.

Embodiment 5. The method of embodiment 1, 2, 3, and/or 4, further comprising receiving a request from an application for a confidence score prior to using the data, wherein the confidence score is generated from the annotations stored in the distributed ledger.

Embodiment 6. The method of embodiment 1, 2, 3, 4, and/or 5, wherein publishing the annotations is not coupled to performing the payment as a service, further comprising receiving a transaction identifier from the distributed ledger after publishing the annotations to the distributed ledger.

Embodiment 7. The method of embodiment 1, 2, 3, 4, 5, and/or 6, further comprising invoking the smart contract using the transaction identifier to perform the payment as a service to transfer the funds.

Embodiment 8. The method of embodiment 1, 2, 3, 4, 5, 6, and/or 7, further comprising writing details of the transaction to a billing ledger.

Embodiment 9. The method of embodiment 1, 2, 3, 4, 5, 6, 7, and/or 8, further comprising sharing the data on a data plane with other applications.

Embodiment 10. The method of embodiment 1, 2, 3, 4, 5, 6, 7, 8, and/or 9, further comprising joining an application to the data confidence fabric, which includes adding the wallet of the user to the data confidence fabric for use by the payment as a service.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, service, or client may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
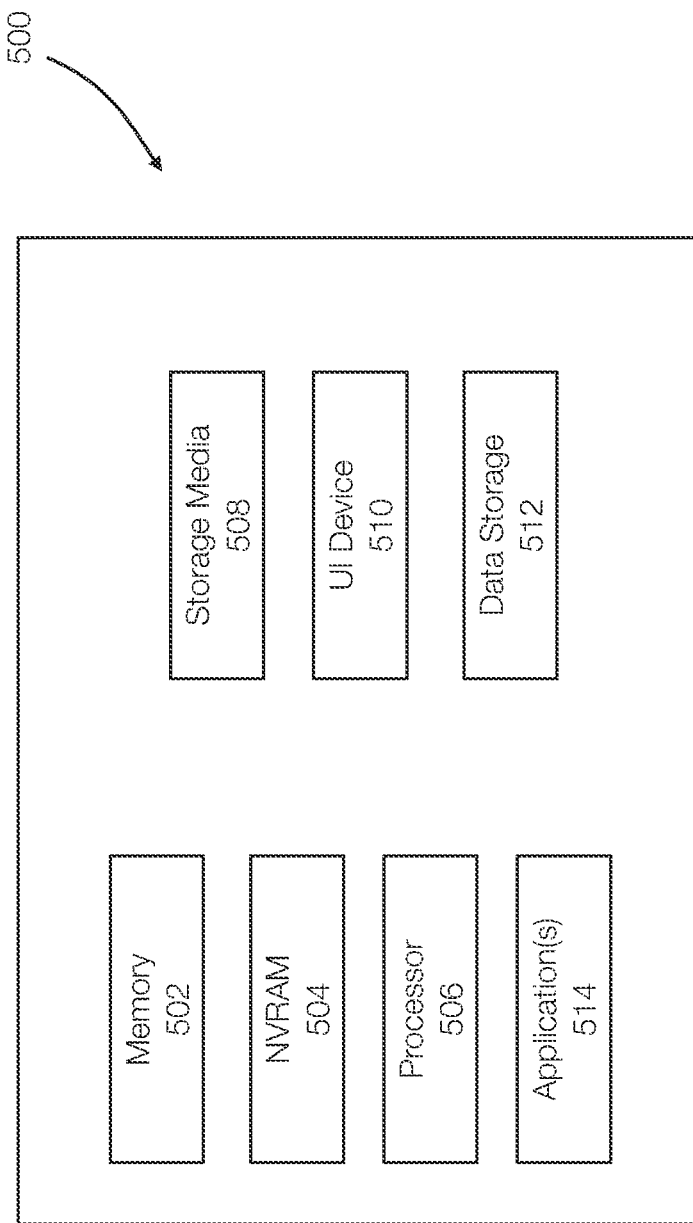
FIG. 5 discloses aspects of a computing device, system, or entity.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving a request from an application, in a data confidence fabric, for trust functions to be applied to data of the application, wherein some of the trust functions are applied at different locations of the data confidence fabric, wherein each of the trust functions is associated with a trust provider, wherein the data confidence fabric includes nodes configured to each apply one or more trust functions, wherein the data of the application traverse specific nodes such that the trust functions identified in the request are applied to the data in the data confidence fabric;

applying the trust functions requested by the application to the data of the application as the data is ingested into the data confidence fabric by the specific nodes, wherein applying the trust functions includes generating annotations, wherein the data is generated by the application or received from a data source;

sending the annotations, in the data confidence fabric, to a smart contract, wherein the annotations relate to the trust functions that have been applied to the data;

performing payment as a service by the smart contract, wherein the smart contract is configured to transfer funds, for each of the trust functions, from a wallet associated with the application to wallets of the trust providers that provided the trust functions, wherein the annotations are published to a distributed ledger when the funds are successfully transferred to the wallets of the trust providers and wherein the annotations are not published to the distributed ledger when the transfer of funds is not successful, providing the annotations and the data to the application.

2. The method of claim 1, wherein publishing the annotations is performed by the smart contract and is coupled to performing the payment as a service by the smart contract.

3. The method of claim 2, further comprising receiving a request from an application for a confidence score prior to using the data, wherein the confidence score is generated from the annotations stored in the distributed ledger.

4. The method of claim 1, wherein publishing the annotations is not coupled to performing the payment as a service, further comprising receiving a transaction identifier from the distributed ledger after publishing the annotations to the distributed ledger.

5. The method of claim 4, further comprising invoking the smart contract using the transaction identifier to perform the payment as a service to transfer the funds.

6. The method of claim 5, further comprising writing details of the transaction to a billing ledger.

7. The method of claim 1, further comprising sharing the data on a data plane with other applications.

8. The method of claim 1, further comprising joining the application to the data confidence fabric, which includes adding the wallet of the user to the data confidence fabric for use by the payment as a service.

9. A non-transitory storage medium having stored therein instructions that are executable by one or more hardware processors to perform operations comprising:

receiving a request from an application, in a data confidence fabric, for trust functions to be applied to data of the application, wherein some of the trust functions are applied at different locations of the data confidence fabric, wherein each of the trust functions is associated with a trust provider, wherein the data confidence fabric includes nodes configured to each apply one or more trust functions, wherein the data of the application traverse specific nodes such that the trust functions identified in the request are applied to the data in the data confidence fabric;

applying the trust functions requested by the application to the data of the application as the data is ingested into the data confidence fabric by the specific nodes, wherein applying the trust functions includes generating annotations, wherein the data is generated by the application or received from a data source;

sending the annotations, in the data confidence fabric, to a smart contract, wherein the annotations relate to the trust functions that have been applied to the data;

performing payment as a service by the smart contract, wherein the smart contract is configured to transfer funds, for each of the trust functions, from a wallet associated with the application to wallets of the trust providers that provided the trust functions, wherein the annotations are published to a distributed ledger when the funds are successfully transferred to the wallets of the trust providers and wherein the annotations are not published to the distributed ledger when the transfer of funds is not successful, providing the annotations and the data to the application.

10. The non-transitory storage medium of claim 9, wherein publishing the annotations is performed by the smart contract and is coupled to performing the payment as a service by the smart contract.

11. The non-transitory storage medium of claim 10, further comprising receiving a request from an application for a confidence score prior to using the data, wherein the confidence score is generated from the annotations stored in the distributed ledger.

12. The non-transitory storage medium of claim 9, wherein publishing the annotations is not coupled to performing the payment as a service, further comprising receiving a transaction identifier from the distributed ledger after publishing the annotations to the distributed ledger.

13. The non-transitory storage medium of claim 12, further comprising invoking the smart contract using the transaction identifier to perform the payment as a service to transfer the funds.

14. The non-transitory storage medium of claim 13, further comprising writing details of the transaction to a billing ledger.

15. The non-transitory storage medium of claim 9, further comprising sharing the data on a data plane with other applications.

16. The non-transitory storage medium of claim 9, further comprising joining the application to the data confidence fabric, which includes adding the wallet of the user to the data confidence fabric for use by the payment as a service.

* * * * *